(12) United States Patent
Zirilli et al.

(10) Patent No.: US 10,120,162 B2
(45) Date of Patent: Nov. 6, 2018

(54) COOLING A DIGITAL MICROMIRROR DEVICE

(71) Applicant: Xerox Corporation, Norwalk, CT (US)

(72) Inventors: Francisco Zirilli, Fairport, NY (US); Michael B. Monahan, Webster, NY (US); Jeffrey John Bradway, Rochester, NY (US)

(73) Assignee: Xerox Corporation, Norwalk, CT (US)

( * ) Notice: Subject to any disclaimer, the term of this patent is extended or adjusted under 35 U.S.C. 154(b) by 99 days.

(21) Appl. No.: 15/342,579

(22) Filed: Nov. 3, 2016

(65) Prior Publication Data

US 2018/0120533 A1    May 3, 2018

(51) Int. Cl.
  *G02B 26/08* (2006.01)
  *G02B 7/18* (2006.01)
  *B41J 2/435* (2006.01)

(52) U.S. Cl.
  CPC ............ *G02B 7/1815* (2013.01); *B41J 2/435* (2013.01); *G02B 26/0833* (2013.01)

(58) Field of Classification Search
  CPC .. G02B 7/1815; G02B 26/0833; G02B 7/181; G02B 7/182; B41J 2/435; H01S 3/0401
  See application file for complete search history.

(56) References Cited

U.S. PATENT DOCUMENTS

| | | | |
|---|---|---|---|
| 6,347,101 B1 * | 2/2002 | Wu ........................ | H01S 3/0941 372/10 |
| 2005/0185244 A1 * | 8/2005 | Fujimori ........... | G02F 1/133385 359/237 |
| 2007/0206158 A1 * | 9/2007 | Kinoshita .............. | G03B 21/16 353/52 |

* cited by examiner

*Primary Examiner* — Joseph P Martinez
*Assistant Examiner* — Vipin Patel

(57) ABSTRACT

An apparatus and a method for cooling a digital mirror device are disclosed. For example, the apparatus includes a digital mirror device (DMD), a thermal pad, wherein a first side of the thermal pad is coupled to a bottom of a housing of the DMD and a cooling block coupled to a second side of the thermal pad that is opposite the first side. The cooling block includes a plate that includes a plurality of openings that generates a liquid jet of a liquid that is forced through the plurality of openings towards a side of the cooling block coupled to the thermal pad.

13 Claims, 6 Drawing Sheets

COOLING A DIGITAL MICROMIRROR DEVICE

The present disclosure relates generally to printers and optical components within certain laser imaging modules and, more particularly, to an apparatus and method for cooling a digital micromirror device.

BACKGROUND

Some printers or imaging devices use a laser imaging module (LIM). The LIM may include one or more lasers that work with one or more optical components to re-direct the laser to a print medium to print an image. During operation, the optical components can generate a large amount of heat due to the amount of power used by the lasers within the LIM.

Large amounts of heat can negatively affect the optical components. For example, large amounts of heat can cause the optical components to operate improperly, operate with a reduced life expectancy, or in extreme instances, cause the optical components to completely fail. Currently used methods may be inefficient in cooling the optical components to a proper temperature range.

SUMMARY

According to aspects illustrated herein, there are provided an apparatus and a method for cooling a digital mirror device. One disclosed feature of the embodiments is a laser imaging module that comprises a digital mirror device (DMD), a thermal pad, wherein a first side of the thermal pad is coupled to a bottom of a housing of the DMD and a cooling block coupled to a second side of the thermal pad that is opposite the first side. The cooling block comprises a plate that includes a plurality of openings that generates a liquid jet of a liquid that is forced through the plurality of openings towards a side of the cooling block coupled to the thermal pad.

Another disclosed feature of the embodiments is a method for cooling the DMD. In one embodiment, the method comprises measuring a temperature of the DMD, determining that the temperature of the DMD is above a threshold and providing a liquid through a cooling block comprising a plate having a plurality of openings that generate a liquid jet of the liquid that is forced through the plurality of openings towards a side of the cooling block coupled to the DMD.

BRIEF DESCRIPTION OF THE DRAWINGS

The teaching of the present disclosure can be readily understood by considering the following detailed description in conjunction with the accompanying drawings, in which.

To facilitate understanding, identical reference numerals have been used, where possible, to designate identical elements that are common to the figures.

DETAILED DESCRIPTION

The present disclosure broadly discloses an apparatus and method for cooling a digital micromirror device (DMD). As discussed above, some printers or imaging devices use a laser imaging module (LIM). The LIM may include one or more lasers that work with one or more optical components to re-direct the laser to a print medium to print an image. During operation, the optical components can generate a large amount of heat due to the amount of power used by the lasers within the LIM.

Large amounts of heat can negatively affect the optical components. For example, large amounts of heat can cause the optical components to operate improperly, operate with a reduced life expectancy, or in extreme instances, cause the optical components to completely fail. Currently used methods may be inefficient in cooling the optical components to a proper temperature range.

DMD's present further challenges to properly cool the DMD due to high heat fluxes involved. Due to how the DMD is mounted on an electrical board, the amount of space available for effective cooling is very limited.

Embodiments of the present disclosure provide a novel apparatus and method that provides a higher heat transfer rate in a cooling block than previous designs. In addition, some embodiments may increase the surface area that is available to be cooled to further increase the heat transfer rate and provide more efficient cooling of the DMD. In further embodiments, a thermoelectric cooling device may also be used to even further increase the heat transfer rate to cool the DMD.

Figure 1:
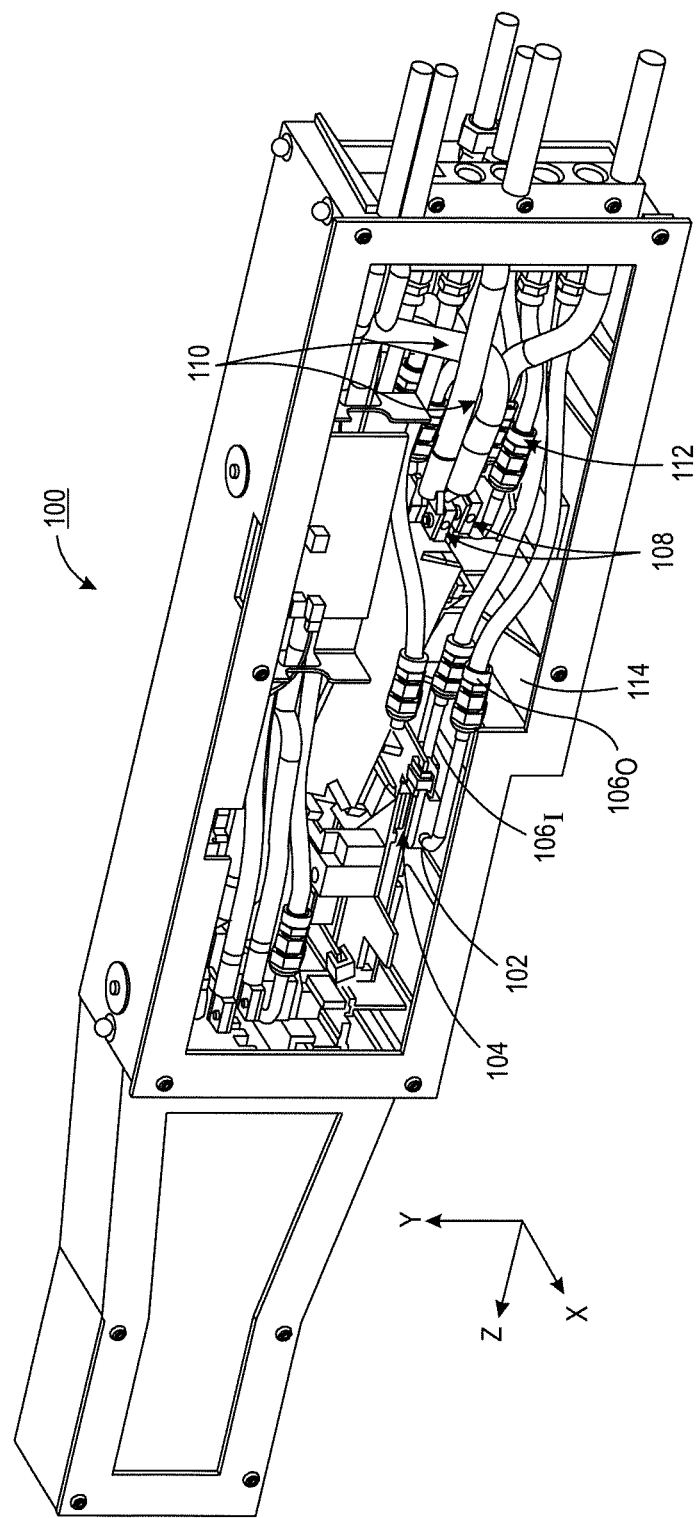
FIG. 1 illustrates an example laser imaging module (LIM) of the present disclosure within a laser imaging module.

FIG. 1 illustrates an example laser imaging module (LIM) or apparatus 100 of the present disclosure. In one embodiment, the LIM 100 may be part of an imaging device or printer. In one embodiment, the LIM 100 may include one or more laser diodes 108 that emit lasers that are redirected by a digital micromirror device (DMD) 104 onto a print medium (e.g., paper, plastic, fabric, and the like). The laser diodes 108 may be connected to a processor, a power source, and the like via one or more electrical connections 110.

In one embodiment, the laser diodes 108 may be powered by a large amount of power. For example, the laser diodes 108 may be powered by as much as 360 Watts of energy and can generate large amounts of heat. In one embodiment, the laser diodes 108 may be cooled by one or more cooling lines 112.

In one embodiment, the DMD 104 may comprise arrays of small mirrors that are used to redirect the laser, or light, emitted by the laser diodes 108. During operation the large amount of energy of the light emitted by the laser diodes 108 can cause the DMD 104 to rise in temperature. High temperatures can cause damage to the DMD 104 or complete failure. For example, temperatures above 70 degrees Celsius (° C.) can cause the life of the DMD 104 to degrade. Temperatures above 120° C. can cause damage to the DMD 104 or cause the DMD 104 to fail.

As noted above, the DMD 104 may present challenges to properly cool the DMD 104 due to high heat fluxes involved.

The amount of space available for effective cooling is very limited due to how the DMD 104 is mounted to the electrical board.

One embodiment of the present disclosure provides a cooling block 102 that is designed to efficiently cool the DMD 104. The cooling block 102 may use a coolant that is moved through the cooling block 102 via an inlet cooling line $106_I$ and an outlet cooling line $106_O$. The inlet cooling line $106_I$ and the outlet cooling line $106_O$ may also be referred to herein collectively as cooling line or lines 106.

In one embodiment, the cooling block 102 and the cooling lines 106 may comprise a metal. For example, the cooling block 102 and the cooling lines 106 may be fabricated from copper or another similar conductive metal.

In one embodiment, the coolant may be any type of liquid that transfers heat away from the DMD 104. One example of a coolant that may be used is a mixture of water and ethylene glycol. Another example of a coolant that may be used is a fluorocarbon-based fluid. An example of such fluorocarbon-based fluids are perflurohexane and perfluoro (2-butyl-tetrahydrofurane), which are known by the tradename of Fluorinert®.

In one embodiment, a heat sensing device 114 may be coupled, directly or indirectly, to cooling block 102 and/or the DMD 104. The heat sensing device 114 may be a thermistor wire, a thermocouple, or any other type of heat sensing device.

The heat sensing device 114 may measure the temperature of the DMD 104. Based on the temperature, a processor or controller, may release, or move, the coolant through the cooling line 106 and the cooling block 102. For example, when the temperature measured by the thermistor wire 114 rises above a temperature threshold (e.g., 70° C., 120° C., and the like), the coolant may be moved through the cooling block 102 to lower, and maintain, the temperature back below the threshold temperature. In another example, the heat sensing device 114 may be used to send feedback to the processor or controller such that the processor could send a command to a chiller and change an inlet coolant temperature.

Figure 2:
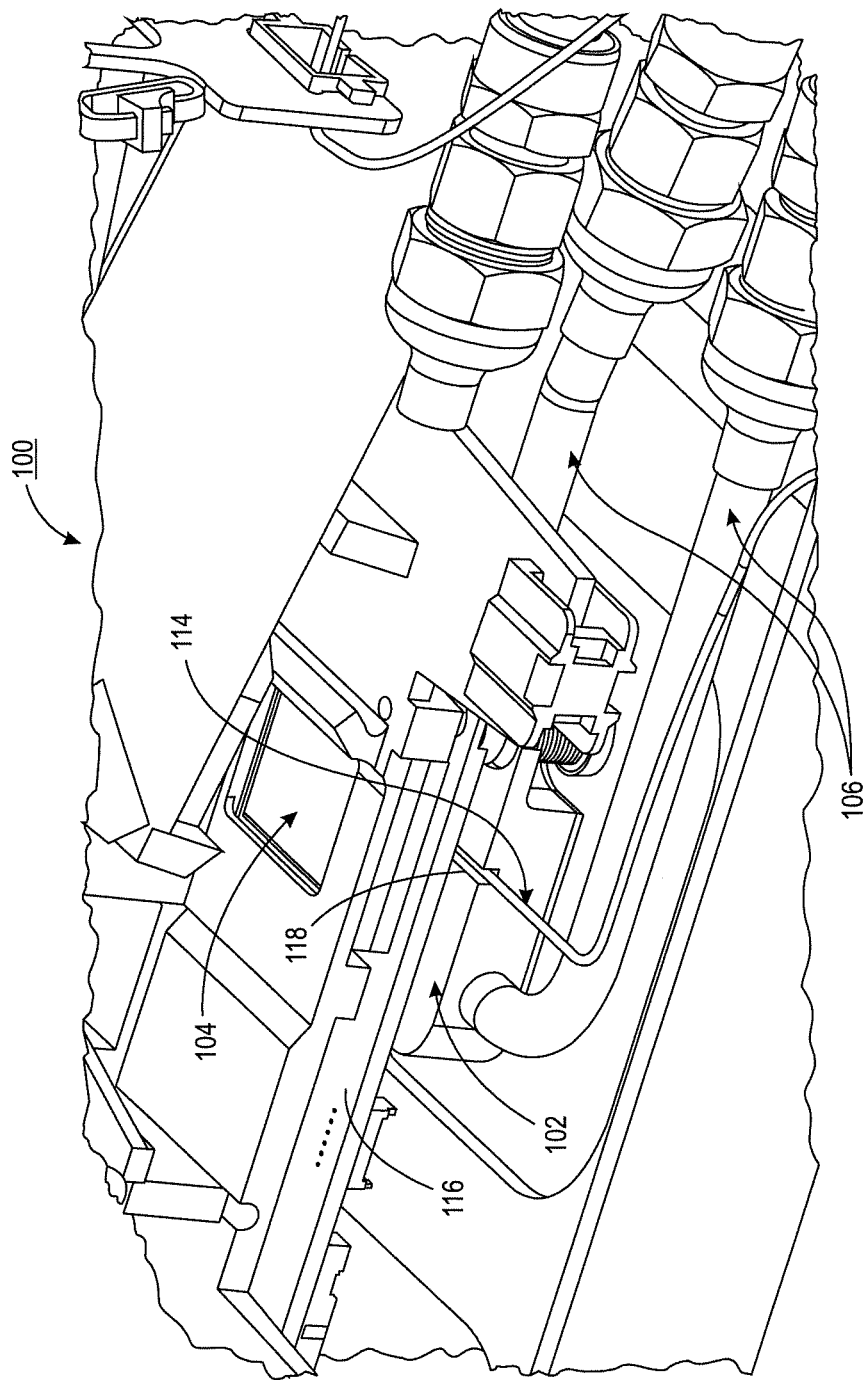
FIG. 2 illustrates a close-up view of an example cooling block within the LIM of the present disclosure.

FIG. 2 illustrates a more detailed view of the cooling block 102 and how it is positioned within the LIM 100. Some components from FIG. 1 have been removed in FIG. 2 to show in greater detail how the DMD 104 is positioned on an electrical board 116 and on the cooling block 104. In one embodiment, the cooling block 102 may include a cut out or groove 118 that holds the heat sensing device 114.

Although the cooling lines 106 are shown as being run laterally or horizontally into the cooling block 102, it should be noted that the cooling lines 106 may be run vertically into the cooling block 102. For example, the cooling lines 106 may be located below the cooling block 102 and enter from a bottom side of the cooling block 102 rather than the lateral sides of the cooling block 102. Running the cooling lines 106 vertically may help remove some turns that may help reduce the overall pressure within the cooling lines 106. Overall, removing as many turns as possible may help reduce the overall pressure within the cooling lines 106 whether the cooling lines 106 are run horizontally or vertically into the cooling block 102. In addition, the cooling lines 106 may be able to deliver, or move, the coolant through the cooling block 102 at a greater velocity, or with more turbulent flow.

Figure 3:
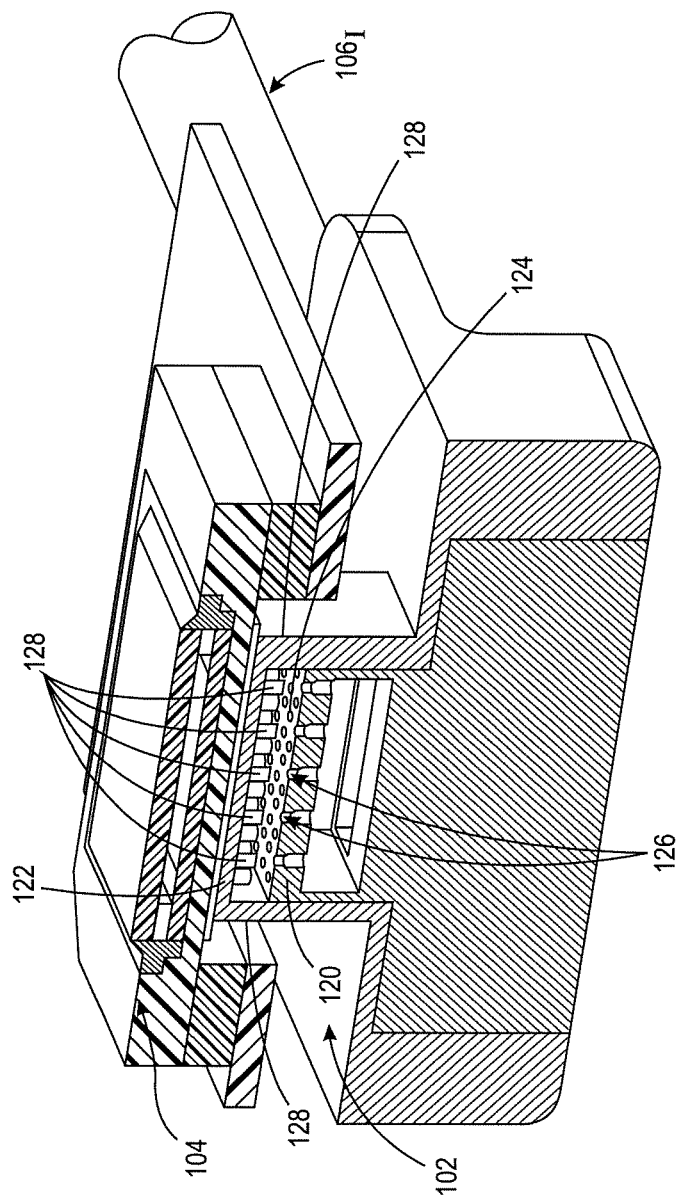
FIG. 3 illustrates a cross section view of the example cooling block of the present disclosure.

FIG. 3 illustrates a cross-sectional view of the cooling block 102. In one embodiment, the cooling block may have an impingement area 124. For example, the impingement area 124 may be a volume within the cooling block 102 that is formed by a wall 120, a top surface 122 and lateral walls 128 of the cooling block 102. The impingement area 124 may be defined as an area where the coolant is moved against the top surface 122 to remove heat away from the DMD 104.

In one embodiment, the wall 120 may include a plurality of openings 126. The openings may be sized to form liquid jets against the top surface 122 of the cooling block 102. In one embodiment, a liquid jet may be defined as a stream of liquid that moves through a respective opening 126 such that the stream of liquid maintains a diameter approximately equal to the a diameter of the respective opening 126 until the stream of liquid contacts the top surface 122.

In one embodiment, the diameter of the openings 126 may be sized to form the liquid jets given a particular pressure and flow rate that the coolant is delivered by the inlet cooling line $106_I$. In one embodiment, the coolant may be delivered at a pressure of approximately 19 pounds per square inch (psi) to 50 psi at a flow rate of approximately 0.3 gallons per minute (gpm) to 0.5 gpm. Under such range of pressure and flow rate, the diameter of the openings 126 may be approximately 0.25 millimeters (mm) to 0.5 mm to form liquid jets of the coolant against the top surface 122 of the cooling block 102.

In one embodiment, the wall 120 may form a demarcation point of an inlet portion and an outlet portion of the cooling block 102. For example, the inlet cooling line 106I may deliver the coolant from below the wall 120. The coolant may be forced through the openings 126 into an outlet portion of the cooling block 102 and then the coolant may then be carried out by the outlet cooling line $106_O$.

As noted above, the way the DMD 104 is coupled to the electrical board 116 and the cooling block 102, a limited amount of surface area may be available for cooling. However, to improve the efficiency of the heat transfer rates and effectiveness of the coolant, the cooling block 102 may also include an uneven surface on the top surface 122 of the cooling block 102. The uneven surface may increase the amount of surface area that contacts the coolant to increase the heat transfer rates.

In one embodiment, the uneven surface may be a roughened surface. For example, the inside portion of the top surface 122 may be scratched or roughened to increase surface area. In another embodiment, the uneven surface may include one or more surface members 128 that protrude from the inside of the top surface 122. The one or more surface members may have a variety of different shapes. For example, the one or more surface members 128 may comprise rows of fins, a plurality of pin fins (e.g., an array of individual cylindrical protrusions), or any other shape that increases the surface area compared an inside of the top surface 122 that is even and smooth.

Figure 4:
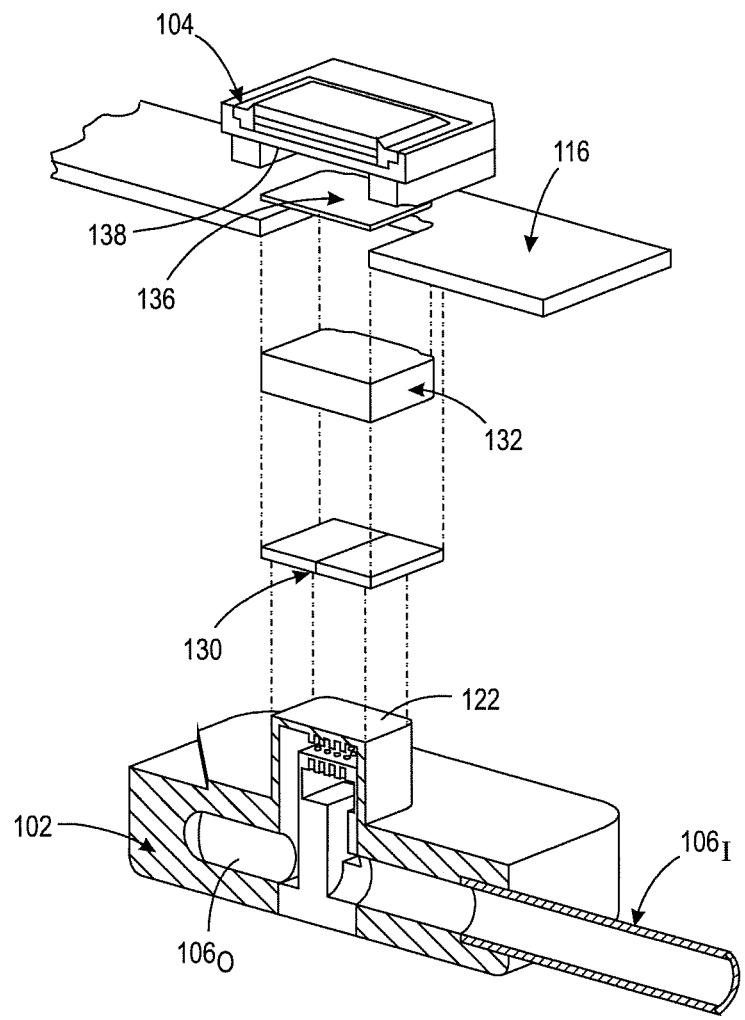
FIG. 4 illustrates an exploded view of an arrangement of the present disclosure.

FIG. 4 illustrates an exploded view of an example arrangement of the cooling block 102 and the DMD 104. In one embodiment, the DMD 104 may be coupled to the electrical board 116 and a bottom surface 138 of the DMD 104 may be coupled to the top surface 122 of the cooling block 102. However, one or more optional components may be added between the bottom surface 138 of the DMD 104 and the top surface 122 of the cooling block 102.

In one embodiment a thermal pad 136 may be coupled to the bottom side 138 of the DMD 104. For example, a first side of the thermal pad 136 may be coupled to the bottom side 138 of the DMD 104 and a second side of the thermal pad 136 that is opposite the first side may be coupled to the top surface 122 of the cooling block 102.

In one embodiment, the thermal pad 136 may ensure that there is no air gap between the bottom side 138 of the DMD 104 and the top surface 122 of the cooling block 102. In one embodiment, the thermal pad 136 may be composed of multiple layers. For example, the thermal pad 136 may include a first layer that is flexible. The first layer may be approximately 0.1 mm thick and be comprised of Indium or a thermal grease.

A second layer of the thermal pad 136 may be stiffer that the first layer. The second layer may be approximately 0.6 mm thick and be comprised of aluminum nitride.

In one embodiment, the thermal pad 136 may include a third layer. For example, the third layer may also be approximately 0.1 mm thick layer of Indium or a thermal grease. In other words, a layer of Indium may be used on both sides of the second layer of aluminum nitride to provide a good interface for both the bottom side 138 of the DMD 104 and top surface 122 of the cooling block 102.

It should be noted that some embodiments use multiple thermal interface materials in the thermal pad 136 to electrically isolate bottom side 138 of the DMD 104 from any chassis ground. For example, the coolant in the cooling lines 106 may be electrically conductive. However, highly thermally conductive materials that are also electrical isolating (e.g., aluminum nitride) may not have good surface conformability to create a good heat transfer interface. Thus, additional layers of a softer material (e.g., Indium or a thermal grease) that have a high conformability, but also have a high thermal conductivity and electrical conductivity can be used.

In other embodiments, the thermal pad 136 may be a single layer if a material having high conformability, high thermal conductivity and also electrically isolating is used. For example, impregnated silicone may be produced with such properties. Also, if the coolant comprises an electrically isolating coolant, then thermal pad 136 may comprise a single layer of Indium or a thermal grease to join the cooling block 102 to the DMD 104.

In one embodiment, to further improve the heat transfer and to efficiently cool the DMD 104, a thermoelectric cooling device 130 may be inserted between the cooling block 102 or the thermal pad 136 and the DMD 104. In one example, the thermoelectric cooling device 130 may be a Peltier device or cooling module. The thermoelectric cooling device 130 may use a single stack Peltier device or a multiple stack Peltier device. In one embodiment, a copper block 132 may also be inserted between the thermoelectric cooling device 130 and the DMD 104 or the thermal pad 136.

The thermoelectric cooling device 130 and the cooling block 102 may work together to efficiently remove heat away from and cool the DMD 104. For example, the thermoelectric cooling device 130 may have a cool side in contact with the DMD 104. A hot side that is opposite the cool side of the thermoelectric cooling device 130 may then contact the cooling block 102. The cooling block 102 may remove heat from the hot side of the thermoelectric cooling device 130.

Figure 5:
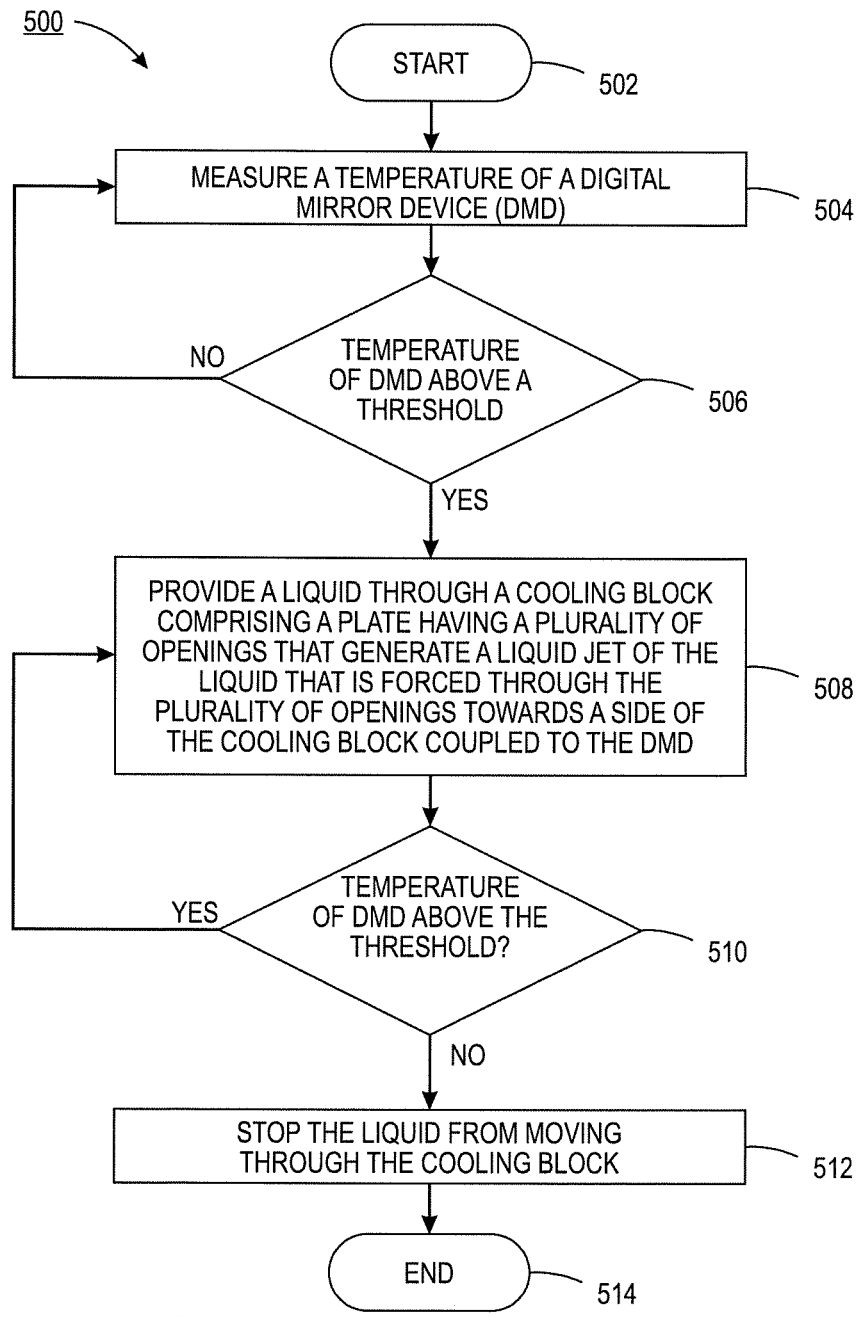
FIG. 5 illustrates a flowchart of an example method for cooling a digital mirror device.
Figure 6:
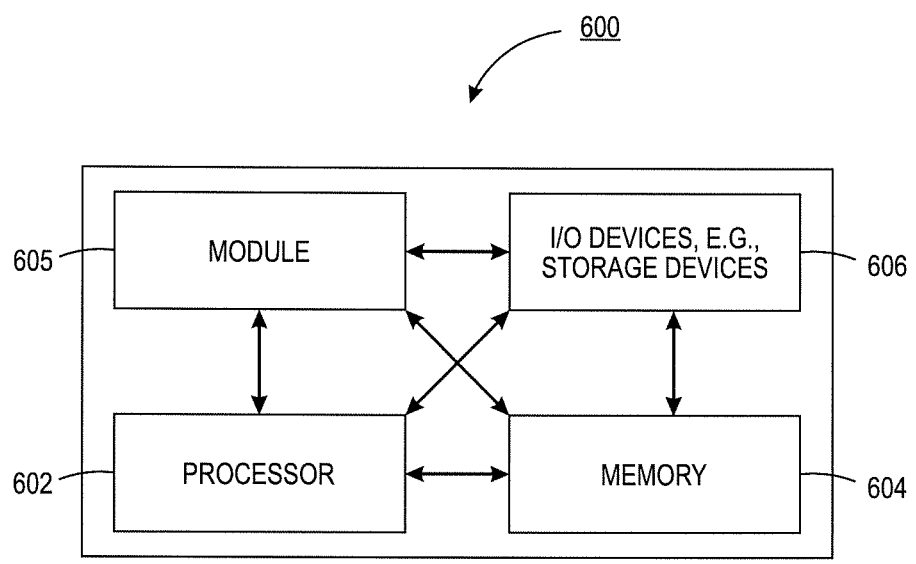
FIG. 6 illustrates a high-level block diagram of a computer suitable for use in performing the functions described herein.

FIG. 5 illustrates a flowchart of an example method 500 for cooling a digital mirror device. In one embodiment, one or more steps or operations of the method 500 may be performed by the LIM 100 or a computer that controls the LIM 100 as illustrated in FIG. 6 and discussed below.

At block 502, the method 500 begins. At block 504, the method 500 measures a temperature of the DMD. For example, the heat sensing device may measure the temperature of the DMD.

At block 506, the method 500 determines if the temperature of the DMD is above a threshold. For example, the threshold may be a temperature that is associated with degradation of life or failure of the DMD. In one embodiment, the threshold may be 20° C.-30° C.

If the temperature is not above the threshold temperature, the method 500 may return to block 504 and continue monitoring the temperature of the DMD. However, if the temperature is above the threshold temperature, the method 500 may proceed to block 508.

At block 508, the method 500 may provide a liquid through a cooling block comprising a plate having a plurality of openings that generate a liquid jet of the liquid that is forced through the plurality of openings towards a side of the cooling block coupled to the DMD. For example, the liquid may be a coolant that is forced through the openings to form the liquid jet. The liquid jet may contact the top surface of the cooling block within an impingement area that is in contact, directly or indirectly, with the DMD.

In one embodiment, the top surface of the cooling block may have an uneven surface. For example, the inner side of the top surface of the cooling block may be rough or include one or more surface members. For example, the surface members may include rows of fins, a plurality of pins, or any other shape that increases the surface area that can contact the liquid jets.

At optional block 510, the method 500 determines if the temperature of the DMD is above the threshold. For example, the heat sensing device may continue to measure the temperature of the DMD. If the temperature of the DMD remains above the threshold, the method 500 may loop back to block 508 and continue to cool the DMD via the liquid that is delivered through the cooling block.

However, if the temperature of the DMD is below the threshold, the method 500 may continue to optional block 512. At optional block 512, the method 500 may stop the liquid from moving through the cooling block. At block 518, the method 500 ends.

In one embodiment, the method 500 may loop indefinitely from block 512 back to block 504. In other words, the method 500 may continuously measure the temperature of the DMD and cool the DMD via the liquid moved through the cooling block as long as the LIM is operating.

It should be noted that although not explicitly specified, one or more steps, functions, or operations of the method 500 described above may include a storing, displaying and/or outputting step as required for a particular application. In other words, any data, records, fields, and/or intermediate results discussed in the methods can be stored, displayed, and/or outputted to another device as required for a particular application. Furthermore, steps, blocks or operations in FIG. 5 that recite a determining operation or involve a decision do not necessarily require that both branches of the determining operation be practiced. In other words, one of the branches of the determining operation can be deemed as an optional step. In addition, one or more steps, blocks, functions or operations of the above described method 500 may comprise optional steps, or can be combined, separated, and/or performed in a different order from that described above, without departing from the example embodiments of the present disclosure. Furthermore, the use of the term "optional" in the above disclosure does not mean that any other steps not labeled as "optional" are not optional. As such, any claims not reciting a step that is not labeled as optional is not to be deemed as missing an essential step, but instead should be deemed as reciting an embodiment where such omitted steps are deemed to be optional in that embodiment.

FIG. 6 depicts a high-level block diagram of a computer that is dedicated to perform the functions described herein. As depicted in FIG. 6, the computer 600 comprises one or more hardware processor elements 602 (e.g., a central processing unit (CPU), a microprocessor, or a multi-core processor), a memory 604, e.g., random access memory (RAM) and/or read only memory (ROM), a module 605 for cooling a digital mirror device, and various input/output devices 606 (e.g., storage devices, including but not limited to, a tape drive, a floppy drive, a hard disk drive or a compact disk drive, a receiver, a transmitter, a speaker, a display, a speech synthesizer, an output port, an input port and a user input device (such as a keyboard, a keypad, a mouse, a microphone and the like)). Although only one processor element is shown, it should be noted that the computer may employ a plurality of processor elements. Furthermore, although only one computer is shown in the figure, if the method(s) as discussed above is implemented in a distributed or parallel manner for a particular illustrative example, i.e., the steps of the above method(s) or the entire method(s) are implemented across multiple or parallel computers, then the computer of this figure is intended to represent each of those multiple computers. Furthermore, one or more hardware processors can be utilized in supporting a virtualized or shared computing environment. The virtualized computing environment may support one or more virtual machines representing computers, servers, or other computing devices. In such virtualized virtual machines, hardware components such as hardware processors and computer-readable storage devices may be virtualized or logically represented.

It should be noted that the present disclosure can be implemented in software and/or in a combination of software and hardware, e.g., using application specific integrated circuits (ASIC), a programmable logic array (PLA), including a field-programmable gate array (FPGA), or a state machine deployed on a hardware device, a computer or any other hardware equivalents, e.g., computer readable instructions pertaining to the method(s) discussed above can be used to configure a hardware processor to perform the steps, functions and/or operations of the above disclosed methods. In one embodiment, instructions and data for the present module or process 605 for cooling a digital mirror device (e.g., a software program comprising computer-executable instructions) can be loaded into memory 604 and executed by hardware processor element 602 to implement the steps, functions or operations as discussed above in connection with the example method 500. Furthermore, when a hardware processor executes instructions to perform "operations," this could include the hardware processor performing the operations directly and/or facilitating, directing, or cooperating with another hardware device or component (e.g., a co-processor and the like) to perform the operations.

The processor executing the computer readable or software instructions relating to the above described method(s) can be perceived as a programmed processor or a specialized processor. As such, the present module 605 for cooling a digital mirror device (including associated data structures) of the present disclosure can be stored on a tangible or physical (broadly non-transitory) computer-readable storage device or medium, e.g., volatile memory, non-volatile memory, ROM memory, RAM memory, magnetic or optical drive, device or diskette and the like. More specifically, the computer-readable storage device may comprise any physical devices that provide the ability to store information such as data and/or instructions to be accessed by a processor or a computing device such as a computer or an application server.

It will be appreciated that variants of the above-disclosed and other features and functions, or alternatives thereof, may be combined into many other different systems or applications. Various presently unforeseen or unanticipated alternatives, modifications, variations, or improvements therein may be subsequently made by those skilled in the art which are also intended to be encompassed by the following claims.

What is claimed is:

1. A method for cooling a digital mirror device (DMD), comprising:
   measuring a temperature of the DMD;
   determining that the temperature of the DMD is above a threshold; and
   providing a liquid through a cooling loop to a cooling block of the DMD, the cooling block comprising a plate having a plurality of openings that generates a liquid jet of the liquid that is forced through the plurality of openings towards a side of the cooling block coupled to the DMD, wherein the liquid is delivered through the plurality of openings at 0.3 gallons per minute (qpm) to 0.5 gpm at 19 pounds per square inch (psi) to 50 psi, wherein the plurality of openings has a diameter of 0.25 millimeters (mm) to 0.5mm.

2. The method of claim 1, further comprising:
   repeating the measuring until the temperature of the DMD is below the threshold; and
   stopping the liquid from moving through the cooling block.

3. The method of claim 1, wherein the temperature is measured by a heat sensing device coupled to the DMD and the cooling block.

4. The method of claim 1, wherein the liquid comprises a coolant comprising at least one of: a mixture of water and ethylene glycol or Fluorinert.

5. A laser imaging module (LIM), comprising:
   a digital mirror device (DMD);
   a thermal pad, wherein a first side of the thermal pad is coupled to a bottom of a housing of the DMD;
   a cooling loop that delivers a liquid; and
   a cooling block coupled to the thermal pad and the cooling loop, wherein the cooling block comprises:
      a plate comprising a plurality of openings, wherein a diameter of each one of the plurality of openings is 0.25 millimeters (mm) to 0.5 mm to deliver 0.3 gallons per minute (gpm) to 0.5 gpm of the liquid at 19 pounds per square inch (psi) to 50 psi through the plurality of openings towards a side of the cooling block coupled to the thermal pad.

6. The LIM of claim 5, further comprising:
   a copper block coupled to the thermal pad; and
   a thermoelectric cooling device coupled to the copper block and the cooling block.

7. The LIM of claim 5, wherein the liquid comprises a coolant comprising at least one of: a mixture of water and ethylene glycol or Fluorinert.

8. The LIM of claim 5, wherein the thermal pad comprises at least a layer of Indium.

9. The LIM of claim 8, wherein the thermal pad further comprises a layer of aluminum nitride.

10. The LIM of claim 5, wherein the cooling block further comprises:

an uneven surface on an inner portion of the side of the cooling block coupled to the thermal pad.

11. The LIM of claim 10, wherein the uneven surface comprises at least one of: a plurality of surface members or a rough surface.

12. The LIM of claim 11, wherein the plurality of surface members comprises at least one of: a plurality of pins or a plurality of fins.

13. The LIM of claim 5, further comprising:
a heat sensing device measure a temperature of the DMD.

* * * * *